Jan. 22, 1935.     H. M. STEPHENSON     1,988,922
CLUTCH FOR DYNAMO ELECTRIC MACHINES
Filed Oct. 12, 1932
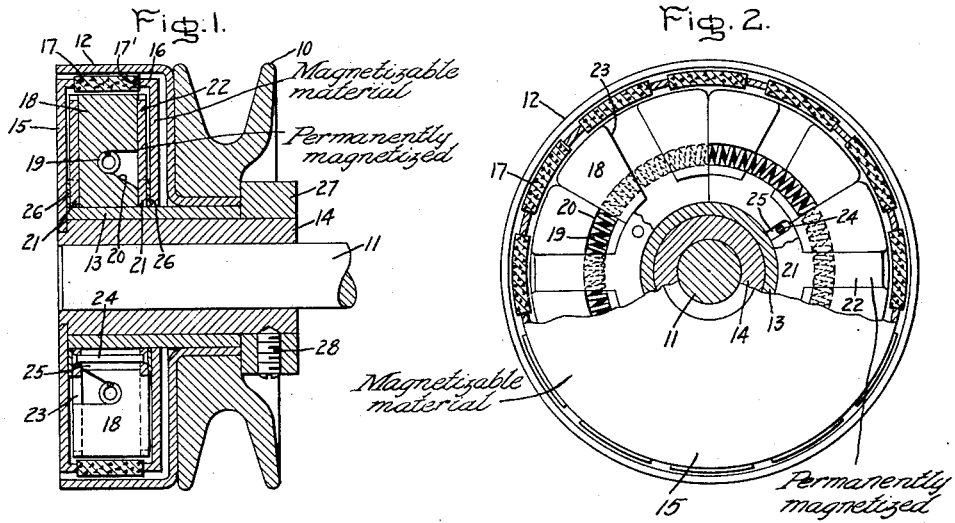
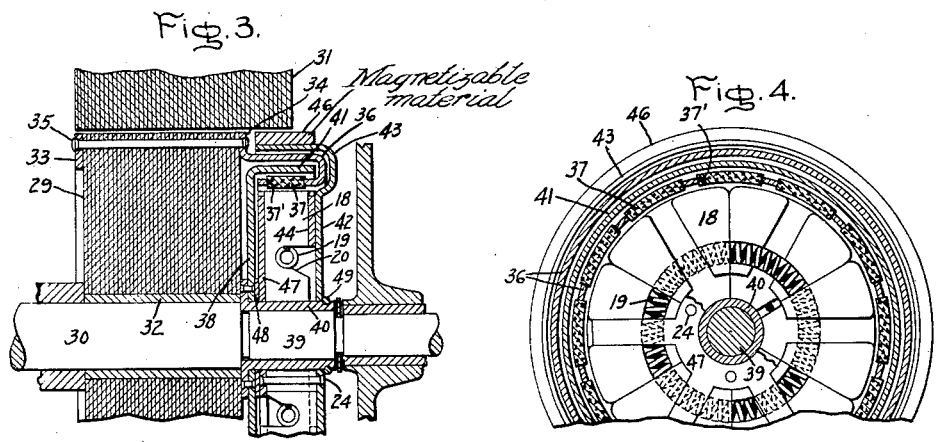
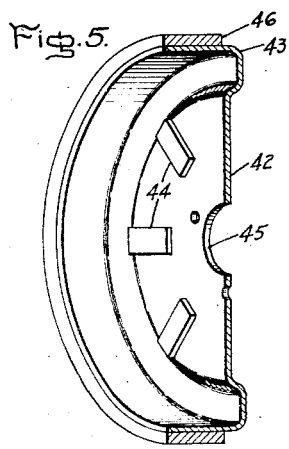
Inventor:
Hugh M. Stephenson,
by Charles E. Mullen
His Attorney.

Patented Jan. 22, 1935

1,988,922

UNITED STATES PATENT OFFICE 1,988,922

CLUTCH FOR DYNAMO-ELECTRIC MACHINES

Hugh M. Stephenson, Fort Wayne, Ind., assignor to General Electric Company, a corporation of New York Application October 12, 1932, Serial No. 637,447

18 Claims. (Cl. 172—120)

My invention relates to centrifugally actuated clutches of the type in which the connection between the driving and driven members of the clutch is delayed until the driving member has attained a predetermined speed.

It is desirable to provide a clutch of this type for connecting an electric motor to its load. In such an application of the clutch the motor rotor is permitted to come up to no-load speed, and the clutch then operated to connect the rotor and the load, so as to utilize the high kinetic energy of the rotor for starting the load, and thereby minimize the starting current required by the motor.

An object of my invention is to provide a clutch operated by a centrifugal actuating mechanism, which is brought up to sufficient speed to actuate the same with delayed action obtained by the use of magnetic flux.

Another object of my invention is to provide an electric motor with a clutch of this type in which the centrifugal actuating mechanism is brought up to sufficient speed to actuate the same by the field of the motor independently of the rotor of the motor.

Further objects and advantages of my invention will become apparent as the following description proceeds and the features of novelty which characterize my invention will be pointed out with particularity in the claims annexed to and forming a part of this specification.

In the accompanying drawing, Fig. 1 is a longitudinal sectional view of a clutch embodying my invention arranged in a driving pulley; Fig. 2 is a side elevation of the structure shown in Fig. 1 partly broken away more clearly to show the construction; Fig. 3 is a longitudinal section of a modified form of my invention as applied to an electric motor; Fig. 4 is a side elevation of Fig. 3 partly broken away; and Fig. 5 is a perspective view of the member which drives the centrifugal weights shown in Figs. 3 and 4.

Referring to the drawing, in Fig. 1 I have shown my invention as embodied in a combined clutch and pulley and arranged to connect a pulley 10 to a driving shaft 11. The pulley 10 is rigidly secured to a cup-shaped driven member 12 and both are rigidly secured to a sleeve 13, which forms an extended hub of the pulley and is free to rotate about a sleeve 14. The sleeve 14 is rigidly secured to the shaft 11 by tightly fitting the sleeve on the shaft. A driving member 15 of the clutch is a hollow housing connected at one end to the sleeve 14 and having an opening at the other end to accommodate the rotatable hub 13. The outer periphery 16 of the member 15 is provided with a plurality of openings 17' having friction blocks 17 arranged therein. An annulus of segmental weights 18 is arranged within the hollow driving member 15, and these weights are actuated by centrifugal force against the action of an annular spring 19 so that they move outwardly and press the blocks 17 into contact with the driven member 12, thereby establishing a frictional driving connection between the pulley 10 and the shaft 11.

I have arranged the centrifugal weights 18 in such manner that when the driving member is started the friction and inertia of the weights will prevent their attaining sufficient speed to move them outwardly by centrifugal force until an appreciable interval after the driving member has attained the desired speed. The annulus of weights 18 is, therefore, arranged about the hub 13, and the weights are retained out of contact with the blocks 17 until the annulus attains a predetermined speed. The weights are retained in this position by the annular spring 19 which is arranged in notches 20 in the sides of the weights, the notches of adjacent weights being presented toward opposite sides of the annulus to prevent displacement of the spring. After the weights have attained the desired predetermined speed, they move suddenly outward and press the friction blocks 17 against the driven member to quickly establish a driving connection between the driving and driven members of the clutch. The weights are mounted between two supporting plates or spiders 21, which are rotatably mounted on the hub 13, and which are provided with arms 22 slidably fitted in guideways 23 in the sides of the weights, so that they serve to guide the weights in their radial movement. The spiders 21 are held together by rivets 24 which pass through cutout portions 25 of the weights adjacent the rivets. This weight assembly is spaced from the driving member 15 by washers 26 to prevent rotation of the weight assembly by friction between the driving member and the plates 21. The hub 13 is retained in place on the sleeve 14 by a collar 27, the collar being secured to the sleeve 14 by a set screw 28. It will thus be seen that when the shaft 11 is started the hollow driving member 15 with friction blocks 17 at the outer periphery thereof will rotate freely within the driven member 12, but the weight assembly will tend to remain stationary, as it is spaced from the driving member by the washers 26, and is mounted on the hub 13, which is prevented from rotating by the load connected to the belt pulley 10.

In order to apply a driving torque to the weight assembly for accelerating the same, I utilize magnetic flux. This is accomplished by permanently magnetizing the arms 22 of the spiders 21 which are made of a suitable material of high magnetic retentivity. As the driving member 15 is made of a magnetizable material, such as soft iron, the rotation of the driving member 15 adjacent the arms 22 of the spiders produces sufficient torque on the arms to gradually accelerate the weight assembly to sufficient speed to move the weights outwardly by centrifugal force against the force of the annular spring 19 so as to engage the driving and driven members of the clutch an interval after the shaft 11 and the driving member 15 is started.

In the operation of the form of my invention shown in Figs. 1 and 2, a power device is connected to the shaft 11, and a load is connected by a belt to the pulley 10. When the shaft 11 is rotated by the power device, the driven member 12 and the hub 13 will remain stationary, because of their connection to the load through a belt on the pulley 10. The magnetic drag between the driving member 15 and the magnetized arms 22 of the plates 21 will begin to rotate the weight assembly which will accelerate to operating speed some time after the driving member has reached the speed desired for starting the load. The rate of acceleration of the weight assembly depends upon the relation of the torque produced by magnetic drag and the resistance to acceleration of the weight assembly due to its inertia and the friction between the same and the hub 13. It is apparent that by varying these factors the clutch may be made to operate with a predetermined delay.

At operating speed the weights 18 move quickly outward overcoming the resistance of spring 19, contact with the rotating friction blocks 17, and press them against the driven member 12, thereby suddenly establishing a frictional driving connection between the driving and driven members, so as to utilize the high kinetic energy of the power device to start the load. This results in high starting torque without the requirement of corresponding high input to the power device. After the weights 18 move outwardly to engage the friction blocks in this manner the weight assembly rotates at the speed of the driving member 15, and the weight 18 will not be retracted to disengage the clutch until the speed of the driving member is sufficiently reduced to permit the spring 19 to overcome the centrifugal force exerted by the weights.

In Figs. 3, 4, and 5 I have shown another construction embodying my invention as applied to an alternating current motor. The motor illustrated is of the induction type and includes a squirrel cage rotor 29 mounted so as to turn freely on a shaft 30 in operative relation to a suitably wound stator 31 for producing a rotating magnetic field, a bearing 32 being provided between the rotor and the shaft. The squirrel-cage winding of the rotor includes end rings 33 and 34 connected by conductor bars 35 in the usual manner. The driving member 36 of the clutch is formed integral with the end ring 34 in the shape of a double flange having a U-shaped cross-section opening toward the rotor 29. A plurality of openings 37' are provided in the inner portion of the flange within which are mounted friction blocks 37. A flanged driven member 38 is riveted to a hub 40, which is tightly fitted on the reduced portion 39 of shaft 30 so as to form a driving connection therewith. The flanged portion 41 of driven member 38 is nested within the driving member 36, so that the friction blocks can be brought into engagement with the flange 41 of the driven member.

The weight assembly in this construction is similar to that shown in Figs. 1 and 2, except that one of the plates 21 is replaced by a cup-shaped weight driving member which is best shown in Fig. 5. This weight driving member comprises a plate 42 having a flange 43 shaped to accommodate the clutch driving member 36, lugs 44 slidably fitted in radial grooves in the sides of the centrifugal weights 18, an opening 45 permitting free rotation about the bushing 40, and an annular ring 46 of magnetic material mounted on the flange 43. Spider 47 is similar in form to spiders 21 in Figs. 1 and 2, but is not magnetized. The weight assembly includes the weights 18, spring 19, spider 47, and weight driving member 42 which are secured together by rivets 24. This weight assembly is mounted to turn freely on bushing 40 and is spaced from the driven member 38 by a washer 48. A retaining ring 49 fitted in an annular groove in the hub 40 keeps the weight assembly in place and retains the ring 46 in the path of the rotating field flux produced by the windings on the stator 31. The ring 46 and weight assembly are designed to have an inherently lesser rate of acceleration in starting than the rotor 29 of the motor, so as to obtain the desired delayed operating characteristics of the clutch.

In the operation of the clutch shown in Figs. 3 to 5, inclusive, current is first supplied to the windings of the stator 31, and a rotating magnetic field is thereby established. This rotating field accelerates the rotor 29 and the driving member 42 of the centrifugal mechanism, since they are not connected to the load. The centrifugal weight mechanism driven by the annular ring 46 on the driving member 42 is designed so that the weights 18 will not move outwardly due to centrifugal force until the speed of the weights has reached any suitable predetermined value. Since the rotor 29 is designed inherently to accelerate at a greater rate than the centrifugal weight driving member 42, it will come up to substantially full no-load speed before the centrifugal mechanism, and the weights will not move outward to connect the driving and driven members of the clutch until the rotor attains this speed. It is to be noted that the weight assembly rests upon the hub 40 which is held stationary by the load before starting, and that there is no mechanical connection between the rotor 29 and the weight assembly which would tend to drive the weight assembly. Thus, it is apparent that the rotating magnetic field-producing torque on the ring 46 is the sole means for rotating the weight assembly, and that the difference in accelerating characteristics of the rotor 29 and the driving member 42 assures the engagement of the driving and driven members of the clutch only after the rotor 29 has attained the desired speed. When the desired speed has been reached the weights move outward suddenly and connect the driving and driven members, thus utilizing the high kinetic energy of the rotor to start the load without drawing high starting current from the line.

Although I have shown my invention as embodied in a clutch applied to a belt pulley and to an electric motor, it is obvious that the magnetically controlled centrifugal mechanism may be useful for other purposes. I do not, therefore, desire my invention to be limited to the particular arrangements shown and described, and I intend in the appended claims to cover all modifications thereof which do not depart from the spirit and scope of my invention.

What I claim as new and desire to secure by Letters Patent of the United States, is:

1. A clutch including a driving member and a driven member, centrifugally actuated means rotatable relatively to said members for establishing a driving connection between said members, and means including a magnetically energized portion of said clutch for accelerating said centrifugally actuated means at a lesser rate than the rate of acceleration of said driving member so as to establish a driving connection between said members an interval after said driving member has attained a predetermined speed.

2. A clutch including a hollow driving member and a driven member, centrifugally actuated means rotatable relatively to said members and arranged within said driving member for establishing a driving connection between said members, and means including a magnetically energized portion of said clutch for accelerating said centrifugally actuated means at a lesser rate than the rate of acceleration of said driving member so as to establish a driving connection between said members an interval after said driving member has attained a predetermined speed.

3. A clutch including a hollow driving member having an opening therein, a driven member, a centrifugally actuated weight rotatable relatively to said members and arranged within said driving member, means cooperating with the opening in said driving member and utilizing the outward movement of said weight for establishing a driving connection between said members, and means including a magnetically energized portion of said clutch for accelerating said weight at a lesser rate than the rate of acceleration of said driving member so as to establish a driving connection between said members an interval after said driving member has attained a predetermined speed.

4. A clutch including a driving member and a driven member forming a substantially closed casing, centrifugally actuated means rotatable relatively to said members and arranged within said casing for establishing a driving connection between said members, and means including a magnetically energized portion of said clutch for accelerating said centrifugally actuated means at a lesser rate than the rate of acceleration of said driving member so as to establish a driving connection between said members an interval after said driving member has attained a predetermined speed.

5. A clutch including a driving member and a driven member, an outwardly movable weight rotatable relatively to said members, means utilizing the outward movement of said weight for connecting said members, and means including a magnetically energized portion of said clutch for accelerating said weight at a lesser rate than the rate of acceleration of said driving member so as to establish a driving connection between said members an interval after said driving member has attained a predetermined speed.

6. A clutch including a driving member and a driven member, an outwardly movable weight rotatable relatively to said members, means utilizing the outward movement of said weight for connecting said members, means for urging said weight toward its axis of rotation, and means including a magnetically energized portion of said clutch for accelerating said weight at a lesser rate than the rate of acceleration of said driving member so as to establish a driving connection between said members an interval after said driving member has attained a predetermined speed.

7. A clutch including a driving member and a driven member, a rotatable annulus of outwardly movable weights rotatable relatively to said members, means utilizing the outward movement of said weights for connecting said members, means for urging said weights toward their axis of rotation, and means including a magnetically energized portion of said clutch for accelerating said weights at a lesser rate than the rate of acceleration of said driving member so as to establish a driving connection between said members an interval after said driving member has attained a predetermined speed.

8. A clutch including a driving member and a driven member, a plurality of outwardly movable weights, means including a spider having arms slidably engaging said weights for supporting said weights rotatably with respect to said members, means utilizing the outward movement of said weights for connecting said members, and means including a magnetically energized portion of said spider for accelerating said weights at a lesser rate than the rate of acceleration of said driving member so as to establish a driving connection between said members an interval after said driving member has attained a predetermined speed.

9. A clutch including a cup-shaped driven member and a hollow driving member having openings in the periphery thereof, friction blocks loosely mounted in the openings in said driving member, centrifugally actuated means within said driving member for urging said blocks against said driven member to establish a driving connection between said members, and means including a magnetically energized portion of said centrifugally actuated means for accelerating said centrifugally actuated means at a lesser rate than the rate of acceleration of said driving member so as to establish a driving connection between said members an interval after said driving member has attained a predetermined speed.

10. A clutch including a cup-shaped driven member and a hollow driving member arranged therein, a hub on said driven member extending within said driving member, an annulus of centrifugally actuated weights arranged about said hub within said driving member and rotatable relatively to said members, means for urging said weights toward said hub, means for utilizing the outward movement of said weights to connect said driving and driven members, and means including a magnetically energized portion of said clutch for accelerating said weights at a lesser rate than the rate of acceleration of said driving member so as to establish a driving connection between said members an interval after said driving member has attained a predetermined speed.

11. In combination with an electric motor having a stator for producing a rotating magnetic field and a rotor, a clutch for connecting said rotor to a load, said clutch including a driving member secured to said rotor and a driven member, centrifugally actuated means for connecting said members, and means including a portion of said clutch responsive to the rotating magnetic field produced by said stator for accelerating said centrifugally actuated means at a lesser rate than the rate of acceleration of said driving member so as to establish a driving connection between said members an interval after said driving member has attained a predetermined speed.

12. An alternating-current motor including a rotatable shaft, a rotor rotatably mounted on said shaft, means including a stator arranged about said rotor for producing a rotating magnetic field, an annular ring secured to said rotor and forming a driving member of a clutch, a driven member for the clutch secured to said shaft, centrifugally actuated means for connecting said members, means extending within said stator and rotatable independently of said rotor for driving said centrifugal means and for accelerating said centrifugal means at a lesser rate than the rate of acceleration of said rotor so as to establish a driving connection between said members an interval after said rotor has attained a predetermined speed.

13. An alternating current motor including a rotatable shaft, a rotor rotatably mounted on said shaft, and means including a stator for producing a rotating magnetic field, a winding on said rotor having an end ring extended to form a clutch driving member, a clutch driven member connected to said shaft, centrifugally actuated means for connecting said clutch members, means including an annular ring of magnetic material responsive to the rotating field of said stator for accelerating said centrifugally actuated means at a lesser rate than the rate of acceleration of said rotor so as to establish a driving connection between said members an interval after said driving member has attained a predetermined speed.

14. A centrifugally actuated mechanism including a rotatable driving member, an outwardly movable weight mounted on said driving member and rotatable relatively thereto, means for restraining the outward movement of said weight, and means including a magnetically energized portion of said mechanism for accelerating said weight at a lesser rate than the rate of acceleration of said driving member so as to move said weight outwardly an interval after said driving member has attained a predetermined speed.

15. A centrifugally actuated mechanism including a rotatable driving member, an annulus of outwardly movable weights arranged about said driving member, means for restraining the outward movement of said weights, a support for said weights rotatably mounted on said driving member, and means including a magnetically energized portion of said support for accelerating said weights at a lesser rate than the rate of acceleration of said driving member so as to move said weights outwardly an interval after said driving member has attained a predetermined speed.

16. A clutch including a driving member and a driven member, centrifugally actuated means rotatable relatively to said members for establishing a driving connection between said members, and means magnetically energizing a portion of said clutch for accelerating said centrifugally actuated means at a lesser rate than the rate of acceleration of said driving member so as to establish a driving connection between said members an interval after said driving member has attained a predetermined speed.

17. A clutch including a driving member and a driven member forming a substantially closed casing, centrifugally actuated means within said casing and rotatable relatively to said members for establishing a driving connection between said members, and means magnetically energizing a portion of said clutch for accelerating said centrifugally actuated means at a lesser rate than the rate of acceleration of said driving member so as to establish a driving connection between said members an interval after said driving member has attained a predetermined speed.

18. A clutch including a driving member and a driven member, an outwardly movable weight rotatable relatively to said members, means utilizing the outward movement of said weight for connecting said members, means for urging said weight towards its axis of rotation, and means magnetically energizing a portion of said clutch for accelerating said weight at a lesser rate than the rate of acceleration of said driving member so as to establish a driving connection between said members an interval after said driving member has attained a predetermined speed.

HUGH M. STEPHENSON.